United States Patent
Correard et al.

[15] 3,681,689
[45] Aug. 1, 1972

[54] DIFFERENTIAL FREQUENCY METER

[72] Inventors: Daniel Correard, Clelles; Emmanuel Friess, Meylan; Antoine Salvi; Roger Tregoures, both of Rueil Malmaison, all of France

[73] Assignee: Commissariat A L'Energie Atomique, Paris, France

[22] Filed: Oct. 14, 1969

[21] Appl. No.: 866,248

[30] Foreign Application Priority Data

Sept. 22, 1969 France ........................ 6932157

[52] U.S. Cl. ........................ 324/79 R, 328/78 R
[51] Int. Cl. ........................ G01n 23/02, G01n 23/14
[58] Field of Search ............ 324/78, 78 D, 79, 79 D; 328/133

[56] References Cited

UNITED STATES PATENTS

| | | | |
|---|---|---|---|
| 2,324,077 | 7/1943 | Goodale et al. | 324/79 |
| 3,502,995 | 3/1970 | Cottatellucci et al. | 324/78 X |
| 3,524,131 | 8/1970 | McWaid | 324/78 D |

FOREIGN PATENTS OR APPLICATIONS

| | | | |
|---|---|---|---|
| 706,298 | 3/1954 | Great Britain | 324/79 |

*Primary Examiner*—Alfred E. Smith
*Attorney*—William D. Stokes

[57] ABSTRACT

Apparatus for measuring the frequency difference ($F_1 - F_2$) between two signals comprises two frequency change ways, each having generator means providing reference signals at frequencies $f_{R1}$ and $f_{R2}$ respectively higher than $F_1$ and $F_2$, first mixing means respectively receiving $F_1$ and $f_{R1}$, or $F_2$ and $f_{R2}$ signals, and low pass filter means fed by said first mixing means and selecting the frequency ($f_{R1} - F_1$) or ($f_{R2} - F_2$). The apparatus also has a common frequency change way receiving the said signals at frequencies ($f_{R1} - F_1$) and ($f_{R2} - F_2$) and having second mixing means of frequency ($F_{R1} - F_1$) and ($f_{R2} - F_2$) signals, low-pass filter means fed by second mixing means and selecting the frequency ($f_{R1} - F_1$) - ($f_{R2} - F_2$) and means for measuring the ($f_{R1} - F_1$) - ($f_{R2} - F_2$) frequency.

6 Claims, 4 Drawing Figures

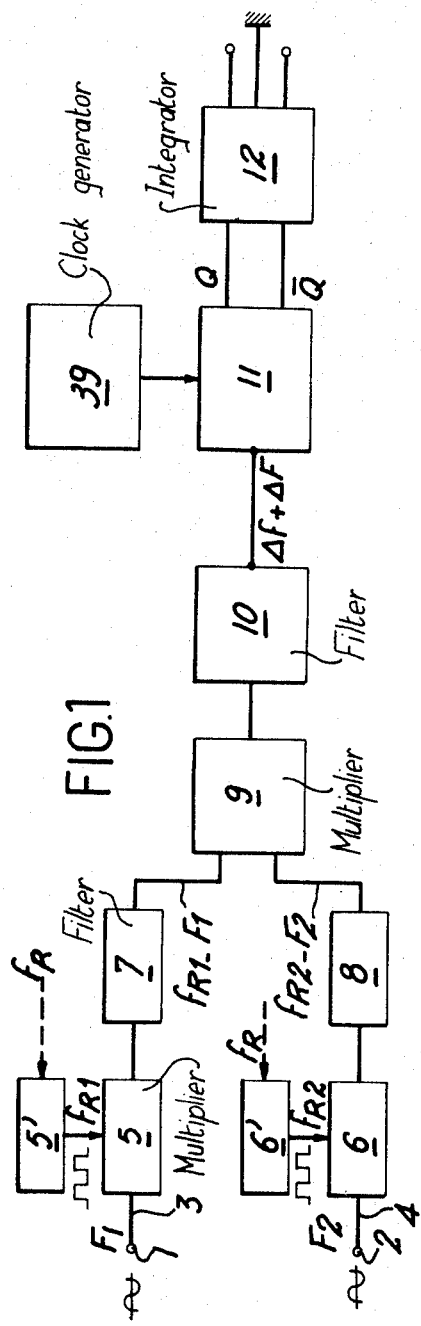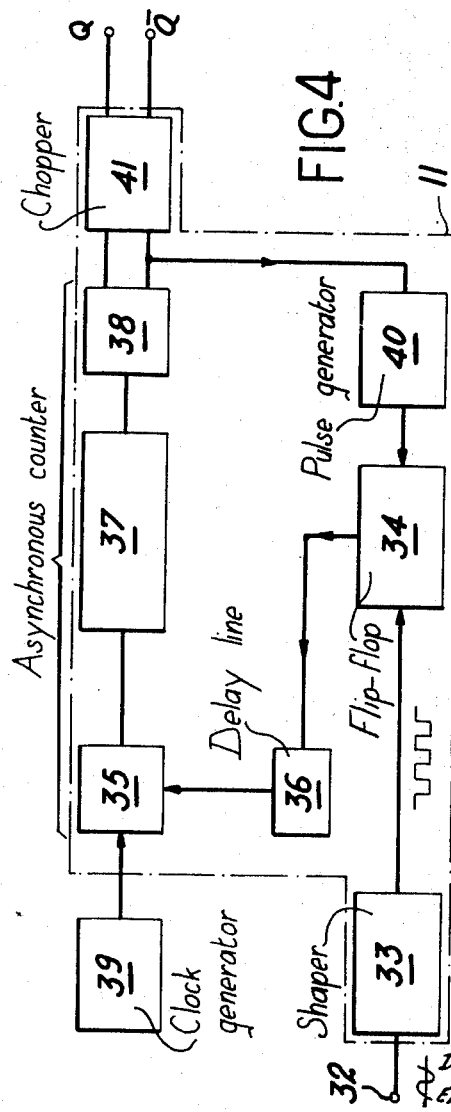

DIFFERENTIAL FREQUENCY METER

This invention relates to a differential frequency meter, that is to say an apparatus for measuring the difference between two frequencies of closely related value. In particular, the invention is very well suited to the differential measurement of the two normally very closely related frequencies of two electric signals derived from two nuclear magnetic resonance (NMR) oscillators. Each oscillator constitutes the main action portion of a magnetometer, which is an apparatus for measuring the intensity of a magnetic field. The invention thus permits the measurement of the difference in moduli of magnetic fields. In fact, it is known that the phenomenon of nuclear magnetic resonance of protons is profitably employed in these devices which translate a magnetic field $H$ into a frequency $f$ according to the Larmor relation:

$$f = \gamma H / 2\pi,$$

wherein $\gamma$ designates the gyromagnetic ratio of the protons. The measurement of a magnetic field or of a difference in moduli of magnetic fields is accordingly restricted to the measurement respectively of the frequency of an electric signal and of the frequency difference which exists between two electric signals. Since magnetometers are mounted on board aircraft in the majority of cases, it is necessary to compensate for the stray magnetic field which is produced by the aircraft. The method employed for automatic compensation of said stray field entails measurement 3,000 the difference in magnetic field moduli between two heads which are spaced along the axis of the aircraft. This method can merely consist in measuring the difference between two frequencies of electric signals which are generated by two nuclear magnetic resonance oscillators. This differential measurement must be highly reproducible irrespective of the value of the total magnetic field. The measurement must also have a very short response time in order that it may thus be possible, for example, to compensate for rapid transient phenomena. The two nuclear oscillators can be placed in a magnetic field having an intensity which can vary between 22,000 gamma to 70,000 gamma (1 gamma = 1 nano-Tesla) which corresponds to a frequency range extending from 1,000 c/s to 2,000 c/s approximately in the case of a proton oscillator.

Direct differential measurement by means of the beats of the two frequencies of signals derived from nuclear oscillators requires a period of time which is much too long: in fact, if the difference between the two frequencies is 1/100 c/s, 100 seconds are necessary in order to detect one cycle. During this time interval, frequency variations are liable to occur, with the result that they are not detected and the automatic compensation has no effect.

The invention provides a differential frequency meter which corresponds to practical requirements more effectively than comparable meters of the prior art, particularly insofar as it carries out an accurate, sensitive and rapid differential measurement of frequency of electric signals and permits measurement over a very wide frequency range and in the presence of noise signals.

To this end, the invention proposes a differential frequency meter for measuring the difference between the two frequencies $F_1$ and $F_2$ of two electric signals, especially for a nuclear magnetic resonance differential magnetometer. Said meter comprises in the case of each signal a frequency-change channel in which is provided a generator for producing reference signals having a frequency $f_{R1}$ or $f_{R2}$ which is higher tan the corresponding frequency $F_1$ or $F_2$, a frequency mixer and a low-pass filter for selecting the lowest frequency $f_{R1} - F_1$ or $f_{R2} - F_2$ which is supplied by the mixer. The frequency meter essentially has a common channel comprising a mixer 9 for the frequencies $f_{R1} - F_1$ and $f_{R2} - F_2$ which are derived from the two channels, a low-pass filter 10 for selecting the lower frequency $(F_1 - f_{R1}) - (F_2 - f_{R2})$ and means for measuring said lower frequency.

Said mixers consist especially of multipliers. In order to measure said lower frequency, the frequency meter preferably comprises a generator for delivering a rectangular signal having a predetermined duration and amplitude each time the amplitude of said signal of lower frequency falls to zero and an integrator for obtaining from said rectangular signals the mean value which is proportional to the value of the frequency $(F_1 - f_{R1}) - (F_2 - f_{R2})$.

The frequency meter can be incorporated in particular in a system for compensating stray magnetic fields in a carried craft of the type described in the patent application which was filed Oct. 15, 1969 by the applicant company titled which has been given Ser. No. 866,501. The frequency meter in accordance with the invention is accordingly associated with two spin-coupling oscillators and measures the difference in moduli of the fields to which the two oscillators are subjected with a response time which is much shorter than that of the system comprising an oscillator and a nuclear filter.

A better understanding of the invention will be gained from the following description of a frequency meter constituting one embodiment of the invention which is particularly well suited to the differential measurement of two very closely related frequencies derived from two nuclear magnetic resonance oscillators of a differential magnetometer. Reference is made in the description to the accompanying drawings, in which:

FIG. 1 is a block diagram of the frequency meter and FIGS. 2, 3 and 4 are detail diagrams showing certain units of the frequency meter of FIG. 1, namely as follows:

FIG. 2 is a diagram of a multiplier which can be employed in each of the two channels of the frequency meter of FIG. 1;

FIG. 3 is a general diagram of the third multiplier which carries out a part of the third frequency change in the frequency meter of FIG. 1;

FIG. 4 is a block diagram of the calibrated-pulse generator which is intended to be employed in the frequency meter of FIG. 1.

Figure 2:
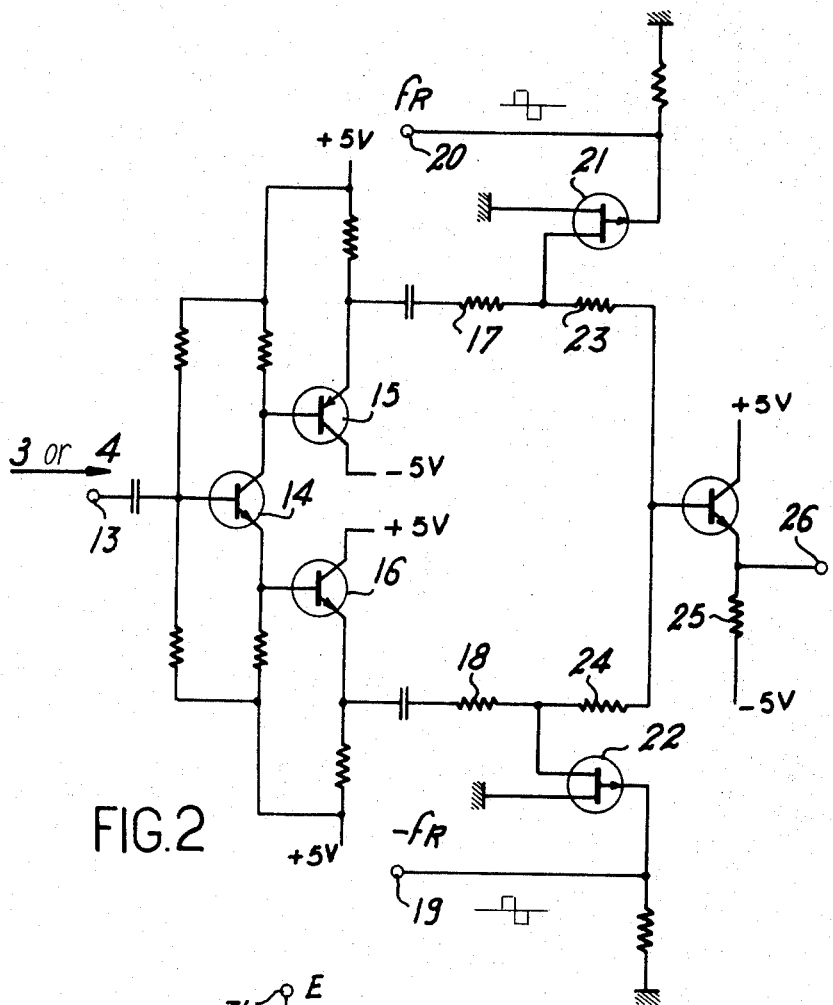

The sine-wave signals having frequencies $F_1$ and $F_2$ which are derived from the two nuclear magnetic resonance oscillators are transmitted respectively to the inputs 1 and 2 of identical channels 3 and 4. Said channels each comprise a mixer constituted by a multiplier 5 or 6 followed by a low-pass filter 7 or 8.

Reference signals having known frequencies $f_{R1}$ and $f_{R2}$ derived from the generators 5' or 6' pass into the respective multipliers 5 and 6. The reference frequencies $f_{R1}$ and $f_{R2}$ can be obtained by selection of harmonics of a same frequency: they can also be obtained by division of a control frequency by adequate numbers. The lowest control frequency is accordingly adopted in this case or, in other words, the value of said frequency will be the lowest common multiple of all the reference frequencies $f_R$ which it is desired to obtain. Each assembly consisting of a multiplier which is associated with its low-pass filter is intended to deliver at its output signals having a frequency which is equal to the difference between the frequencies of the signals which are fed to the input of the multiplier, that is to say having the value ($f_{R1} - F_1$) in the case of channel 3 and ($f_{R2} - F_2$) in the case of channel 4.

A multiplier 9 then obtains the product of the signals derived from channels 3 and 4 and having a frequency equal to ($f_{R1} - F_1$) and ($f_{R2} - F_2$). A low-pass filter 10 which is associated with the multiplier 9 delivers at its output signals having a frequency equal to the difference between the frequencies of the signals which are fed to the two inputs of the multiplier 9. This frequency is therefore equal to ($\Delta f - \Delta F$), wherein $\Delta f$ is equal to ($f_{R2} - f_{R1}$) and wherein $\Delta F$ is equal to ($F_1 - F_2$). A generator 11 constituted mainly by a monostable multivibrator which is triggered periodically by the signal having a frequency ($\Delta f + \Delta F$) and a chopper which calibrates the output voltage delivers pulses which are calibrated on the one hand in duration and on the other hand in amplitude and at a frequency equal to $\Delta F + \Delta f$. Said generator has two outputs Q, $\overline{Q}$ for the complementary pulses and delivers a rectangular pulse which is calibrated both in duration and in amplitude (output Q) and the complement of said pulse (output $\overline{Q}$) each time the amplitude of the input signal having a frequency ($\Delta f + \Delta F$) falls to zero. The mean value of said rectangular pulses is accordingly proportional to the frequency $\Delta F + \Delta f$ which it is desired to measure, namely to the frequency $\Delta F$ to within the nearest constant. This mean value is obtained at the two outputs (one output being complementary with the other) of an integrator 12.

In FIG. 2 which represents a detail diagram of the multiplier 5 or 6, the sine-wave signal having a frequency $F_1$ or $F_2$ which is derived from one of the nuclear magnetic resonance oscillators is applied at the input 13 to the base of an n–p–n transistor 14. Said transistor is mounted as a phase-shifter or, in other words, is associated with two transistors 15 and 16 which are mounted for impedance matching and serves to obtain two signals which are displaced in phase by $\pi$ and have an identical amplitude at the terminals of resistors 17 and 18 of low value. The reference signals having a frequency $f_R$, ($f_{R1}$ in the case of channel 1 and $f_{R2}$ in the case of channel 2) or having a square shape are fed to the inputs 19 and 20 and pass into the field-effect transistors 21 and 22 via the gate electrode; the source of these transistors 21 and 22 is connected to ground and their drain is connected either to the resistor 17 or to the resistor 18. Clipping of a sine-wave signal which is applied at the input 13 is performed by a square signal which is applied at the inputs 19 and 20. The field-effect transistors clip signals which are in opposite phase on the two branches of the circuit. These clipped signals are summated in the resistors 23 and 24 and collected at the terminals of a resistor 25. The notations + 5 V or − 5 V indicate that the bias voltage at the point considered is + 5 volts or − 5 volts. It is apparent that this circuit obtains the product of the sine-wave signals which are applied at the input 13 and of the square-topped signals which are applied to the inputs 19 and 20: by resolving the square-topped signal into a Fourier series, it is apparent that the signal collected at the output 26 will therefore have the form: sin $\omega t$. $4/\pi$ (sin $\omega_R t$ + 1/3 sin 3 $\omega_R t$ + 1/5 sin 5 $\omega_R t$ ...) wherein $\omega$ and $\omega_R$ designate the angular frequency of the signal, respectively of the incident signal having a frequency F and of the reference signal having the frequency $f_R$.

There is therefore collected at the output a signal composed of the frequencies: ($\omega_R - \omega$), ($\omega + \omega_R$), ($3\omega_R - \omega$), ($3\omega_R + \omega$), etc...

Since it is desired to retain only a signal having the angular frequency or pulsation ($\omega_R - \omega$), it is necessary to eliminate all the other pulsations. This is achieved by means of the low-pass filters 7 and 8. The cut-off frequency of these filters must accordingly be below the lowest frequency, other than ($\omega_R - \omega$) which appears at the input, that is to say ($\omega + \omega_R$). Moreover, account must be taken of the fact that the clipping which is performed by the multipliers 5 and 6 is not perfect and that there exists at the outputs of these latter a residual component having a pulsation $\omega$: the cut-off frequency of the low-pass filters must therefore be chosen so as to be lower than $\omega$. The pulsation $\omega_R$ is chosen so as to be higher than $\omega$ and to reject the reference frequency beyond the filter pass-band.

Figure 3:
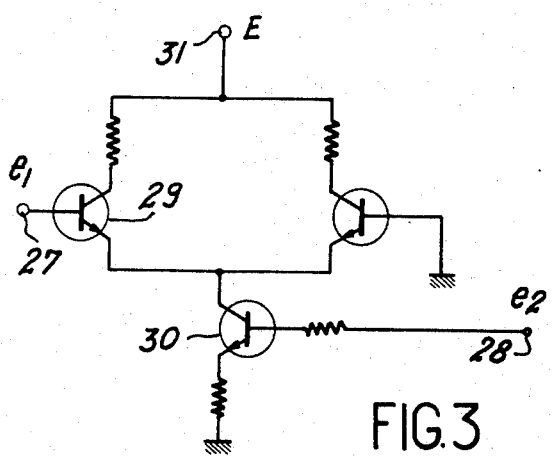

The signals $e_1$ and $e_2$ which are fed to the two inputs of the multiplier 9 are sinusoidal and therefore have frequencies which are equal to ($f_{R1} - F_1$) in the case of one input and ($f_{R2} - F_2$) in the case of the other input. In the multiplier 9 which is shown in FIG. 3, the signals $e_1$ and $e_2$ to be mixed are fed to the inputs 27 and 28. The n–p–n transistor 29 is voltage-driven by the signal $e_1$ whilst the n–p–n transistor 30 is current-driven by the signal $e_2$. It is demonstrated that in this case the collector current of the transistor 29 is proportional to the products of the signals $e_1$ and $e_2$. The bias voltage E is applied at 31.

A low-pass filter 10 which is connected to the output of the multiplier 9 delivers at its output signals having a frequency ($\Delta f + \Delta F$). The low-pass filters 7, 8 and 10 which are employed can be of any type known per se such as the Papoulis type described in the article entitled "Optimum Filters with Monotonic Response" and published in Proceedings of the IRE (Mar. 1958, P. 606 to 609).

The signals derived from the low-pass filter 10 are applied at the input 32 of a pulse generator 11 in which the pulses are calibrated in amplitude and in duration and the detail block diagram of which is given in FIG. 4. This generator can be compared with a monostable circuit of complex design. The input signals which are substantially sinusoidal are given a rectangular waveform by means of the shaping circuit 33. These rectangular pulses have a frequency which is double the frequency of the pulses applied at the input of the circuit 33, thereby permitting the possibility of doubling the sensitivity of the measurement. These pulses of rectangular shape are applied to the input of a control flip-flop 34 which effects the opening of a first flip-flop 35 with a time-lag which is determined by the circuit 36. The "boxes" 35, 37 and 38 represent an asynchronous counting chain wherein 37 is an assembly of fifteen flip-flops and 38 is the last flip-flop of the counting chain. A high-frequency oscillator 39 is coupled to the asynchronous counting chain via one of the inputs of the first flip-flop 35. At the outset, all the flip-flops are in a non-conducting state. When a rectangular pulse which is derived from the shaping circuit 33 passes into the control flip-flop 34, this latter delivers a signal which triggers the flip-flop 35 into the conducting state. The clock pulses delivered by the oscillator 39 are then propagated along the entire asynchronous counting chain and the different flip-flops become conducting in turn. When the last flip-flop 38 changes state, a pulse is delivered to the control flip-flop 34 by means of a pulse generator 40. The control flip-flop 34 then delivers a signal which changes the different flip-flops from the conducting state to the non-conducting state. The duration of the rectangular signal which is derived from the final flip-flop is well determined since it is equal to ½ $2^n T_0$ wherein n designates the number of flip-flops of the assemblies 35, 37 and 38 and $T_0$ designates the period of the pulses delivered by the oscillator 39. The amplitude calibration of the rectangular pulses is carried out by means of the so-called chopper circuit 41. A zener-diode stabilized reference voltage is employed to modulate a reference voltage in said chopper circuit. Pulses which are perfectly calibrated both in amplitude and in duration are accordingly obtained at the output Q of the chopper circuit 41. The output $\overline{Q}$ serves to deliver pulses which are complementary to the pulses of the output Q.

The integrator 12 gives the mean value of the rectangular pulses Q and $\overline{Q}$ which is proportional to the value of the frequency $(\Delta f + \Delta F)$. The integrator therefore delivers at its output a voltage which is proportional to within the nearest constant $\Delta f$ to the difference between the frequencies $\Delta F$ which it is desired to measure. Said integrator 12 is composed of two wholly symmetrical channels (normal channel and complementary channel) and is mainly constituted by a low-pass filter of the Papoulis type in which a cut-off frequency of very low value makes it possible to suppress the maximum amount of noise but increases the response time. It is therefore necessary to adopt a compromise between the acceptable noise level at the output and the desired response time.

The frequencies $f_{R1}$ and $f_{R2}$ of the square-topped signals which are fed into the multiplier 5 and 6 are successive multiples of a same frequency $F_R$ so that we may write $$f_{R1} = (n+1)F_R$$

$$f_{R2} = nF_R$$

These frequencies $f_{R1}$ and $f_{R2}$ are obtained by selecting two successive harmonics of a frequency $F_R$.

In the particular mode of application of the invention which has been described and which is intended for the measurement of two closely related frequencies $F_1$ and $F_2$ of electric signals derived from two nuclear magnetic resonance oscillators, the values of the frequencies $F_1$ and $F_2$ are within the range of 1,000 c/s to 3,000 c/s (which corresponds to a magnetic field of 22,000 gamma to 70,000 gamma in the case of a proton oscillator). The known frequencies $f_{R1}$ and $f_{R2}$ are higher than the frequencies $F_1$ and $F_2$. In order to cover the entire frequency range, three pairs of known frequencies $f_R$ located at 1,700 c/s, 2,400 c/s and 3,100 c/s have been selected. Within each pair, the frequencies are spaced by 42,576 c/s (which corresponds to 1,000 gamma); the value of $\Delta f$ is therefore equal to 42.576 c/s. The cut-off frequencies of the low-pass filters 7, 8 and 10 are respectively 750 c/s, (750 + 42.5) c/s, 65 c/s. The frequency $F_0$ of the oscillator 39 is equal to 11 Mc/s.

The range of measurement which can be carried out by means of the device herein described corresponds to differences in frequencies of signals applied at the input of the frequency meter which vary between 0 and several tens of cycles per second. The response time of the device is of the order of one second but is variable according to the electronic components employed and the values selected in the case of the pass-bands of the low-pass filters and mainly in the case of the pass-band of the integrator 41. The maximum resolution which can be obtained is 1/5,000 c/s.

The method and the differential frequency meter in accordance with the present invention are primary intended for the differential measurement of closely related frequencies of electric signals. However, by making use of only one of the two inputs of the frequency meter and therefore only one of said two channels, it is possible to take an absolute measurement of the frequency of an electric signal.

It is self-evident that this invention is not limited solely to the embodiment which has been illustrated and described by way of example and that the scope of this patent also extends to alternative forms of either all or part of the arrangements herein described which remain within the scope of equivalent means as well as to any applications of such arrangements.

In particular, the frequency meter which is described is suited to the measurement of a difference in magnetic field by utilization of the nuclear magnetic resonance effect but can clearly be employed as soon as it is required to measure a difference between two closely related frequencies. The values which are indicated in respect of the reference frequencies $f_{R1}$ and $f_{R2}$ as well as the value of the frequency $F_0$ of the oscillator 39 and the cut-off frequencies of the low-pass filters 7, 8 and 10 are given only by way of example: these values can be modified by the use as a function of the values of the frequencies $F_1$ and $F_2$ of the signals which are applied at the inputs of the frequency meter.

We claim:

1. Apparatus for measuring the frequency difference ($\Delta F$) between two signals at frequencies $F_1$ and $F_2$, said apparatus comprising;

a first signal channel including:
   a first signal generator for generating a reference signal at a frequency $f_{R1}$ different than $F_1$;
   a first mixer connected so as to receive the signals at frequencies $f_{R1}$ and $F_1$, combine them, and generate a signal having a plurality of frequency components; and,
   a first low pass filter connected to the output of said first mixer for selecting and passing only the lowest frequency component, $f_{R1}-F_1$, of the signal generated by said first mixer;

a second signal channel including:
  a second signal generator for generating a reference signal at a frequency $f_{R2}$ different than $f_{R1}$ and different than $F_2$;
  a second mixer connected so as to receive the signals at frequencies $f_{R2}$ and $F_2$, combine them, and generate a signal having a plurality of frequency components; and,
  a second low pass filter connected to the output of said second mixer for selecting and passing only the lowest frequency component, $f_{R2}-F_2$, of the signal generated by said second mixer;

a common signal channel including:
  a third mixer connected to said first and second low-pass filters so as to receive the signals at frequencies $f_{R1}-F_1$ and $f_{R2}-F_2$, combine them, and generate a signal that includes a frequency component $(f_{R1}-F_1)-(f_{R2}-F_2)$; and,
  a third-low pass filter connected to the output of said third mixer for selecting and passing only the frequency component $(f_{R1}-F_1)-(f_{R2}-F_2)$ of the signal generated by said third mixer;

measuring means connected to the output of said third low pass filter means for measuring the frequency of said frequency component $(f_{R1}-F_1)-(f_{R2}F_2)$.

2. Apparatus according to claim 1 wherein said measuring means comprises:
  a rectangular pulse generator that generates pulses having a predetermined amplitude and time duration, said generator being connected to the output of said third low pass filter and being triggered each time the amplitude of said $(f_{R1}-F_1)-(f_{R2}-F_2)$ signal component becomes zero; and,
  an integrator connected to the output of said rectangular pulse generator for integrating the rectangular pulses generated by said rectangular pulse generator each time it is triggered.

3. Apparatus according to claim 2 wherein said rectangular pulse generator comprises:
  a stabilized clock oscillator; and,
  a flip-flop circuit connected to the output of said stabilized clock oscillator, said flip-flop circuit delivering pulses of time duration at a multiple of the oscillation period of said stabilized clock oscillator.

4. Apparatus according to claim 1 wherein the signals $f_{R1}$ and $f_{R2}$ generated by said first and second signal generators are successive multiples of the same frequency.

5. Apparatus according to claim 4 wherein said first and second signal generators generate successive harmonics of a fundamental frequency $f_R$ generated by a stabilized oscillator.

6. Apparatus for measuring the frequency difference ($\Delta F$) between two signals at frequencies $F_1$ and $F_2$, said apparatus comprising:

a first signal channel including:
  a first signal generator for generating a reference signal at a frequency $f_{R1}$ higher than $F_1$;
  a first multiplier connected so as to receive the signals at frequencies $f_{R1}$ and $F_1$, multiply them, and generate a signal having a plurality of frequency components; and,
  a first low pass filter connected to the output of said first multiplier for selecting and passing only the lowest frequency component, $f_{R1}-F_1$, of the signal generated by said first multiplier;

a second signal channel including:
  a second signal generator for generating a reference signal at a frequency $f_{R2}$ different than $f_{R1}$ and higher than $F_2$;
  a second multiplier connected so as to receive the signals at frequencies $f_{R2}$ and $F_2$, multiply them, and generate a signal having a plurality of frequency components; and
  a second low pass filter connected to the output of said second multiplier for selecting and passing only the lowest frequency component, $f_{R2}-F_2$, of the signal generated by said second multiplier;

a common signal channel including:
  a third multiplier connected to said first and second low pass filters so as to receive the signals at frequencies $f_{R1}-F_1$ and $f_{R2}-F_2$, multiply them, and generate a signal that includes a frequency component $(f_{R1}-F_1)-(f_{R2}-F_2)$; and,
  a third low pass filter connected to the output of said third multiplier for selecting and passing only the frequency component $(f_{R1}-F_1)-(f_{R2}-F_2)$ of the signal generated by said third multiplier; and, measuring means connected to the output of said third low pass filter means for measuring the frequency of said frequency component $(f_{R1}-F_1)-(f_{R2}-f_2)$.

* * * * *